United States Patent [19]

Kervagoret

[11] Patent Number: 4,809,508
[45] Date of Patent: Mar. 7, 1989

[54] CLUTCH-DISENGAGING HYDRAULIC ACTUATORS PREVENTING WHEEL SLIP

[75] Inventor: Gilbert Kervagoret, Argenteuil, France

[73] Assignee: Bendix France, Drancy, France

[21] Appl. No.: 29,306

[22] Filed: Mar. 23, 1987

[30] Foreign Application Priority Data

Mar. 26, 1986 [FR] France ................ 86 04356

[51] Int. Cl.$^4$ .............. F16D 25/14; F16D 43/284
[52] U.S. Cl. ................................ 60/566; 60/567; 60/593; 92/84; 92/DIG. 4; 192/91 R; 192/13 R; 137/596.17
[58] Field of Search ............ 60/565, 566, 557, 567, 60/593; 192/83, 85 C, 91 R, 101, 103 F, 103 R, 13 R; 92/30, 84; 137/DIG. 4, 596.17

[56] References Cited

U.S. PATENT DOCUMENTS

| 1,131,401 | 3/1915 | MacPherson | 192/85 C |
|---|---|---|---|
| 2,649,842 | 8/1953 | Caldwell et al. | 92/DIG. 4 X |
| 2,734,609 | 2/1956 | Fritzch | 192/85 C X |
| 3,040,775 | 6/1962 | Ray | 137/623 |
| 3,054,386 | 9/1962 | Bohnhoff | 60/557 |
| 3,292,751 | 12/1966 | McRay et al. | 192/83 X |
| 3,424,281 | 1/1969 | Kawabe | 60/565 |
| 3,514,163 | 5/1970 | MacDuff | 60/565 |
| 3,831,999 | 8/1974 | Sonneborn | 92/DIG. 4 X |
| 3,921,773 | 11/1975 | Dietrich | 192/83 |
| 4,622,814 | 11/1986 | Kervagoret | 60/566 |
| 4,641,894 | 2/1987 | Belart | 60/591 |
| 4,676,353 | 6/1987 | Matsuda | 192/13 R |
| 4,693,521 | 9/1987 | Takata | 60/566 |
| 4,729,462 | 3/1988 | Braun | 192/85 C X |

FOREIGN PATENT DOCUMENTS

| 1914545 | 10/1969 | Fed. Rep. of Germany . |
| 2052307 | 5/1972 | Fed. Rep. of Germany . |
| 1953499 | 12/1975 | Fed. Rep. of Germany . |
| 2657197 | 6/1978 | Fed. Rep. of Germany . |
| 79576 | 11/1962 | France . |
| 1543213 | 9/1968 | France . |
| 2139491 | 1/1973 | France . |
| 2276522 | 1/1976 | France . |
| 435410 | 11/1974 | U.S.S.R. . |
| 2117475 | 10/1983 | United Kingdom . |

Primary Examiner—Robert E. Garrett
Assistant Examiner—George Kapsalas
Attorney, Agent, or Firm—Larry J. Palguta; Ken C. Decker

[57] ABSTRACT

Hydraulic booster device intended to be arranged in parallel with a primary actuation circuit between an actuator mechanism and a receiver, the device comprising an electromagnetic valve mechanism (10) arranged between an actuator (12) and a pressure-fluid source (16), the actuator (12) comprising a piston means (56, 66, 92) displaceable under the effect of the pressure-fluid and intended to actuate the receiver independently in response to an electrical control signal supplied to the valve mechanism (10).

7 Claims, 2 Drawing Sheets

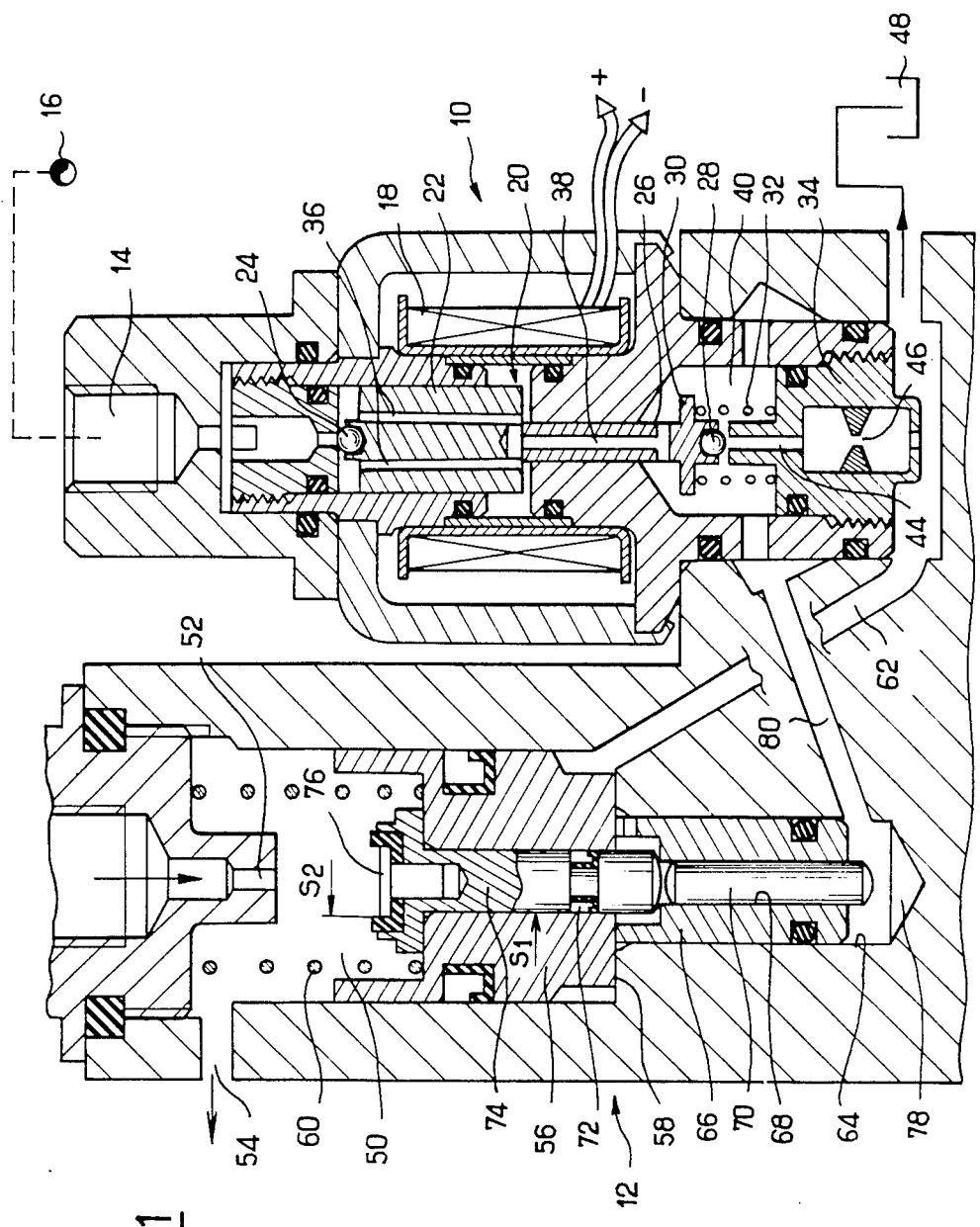
FIG_1

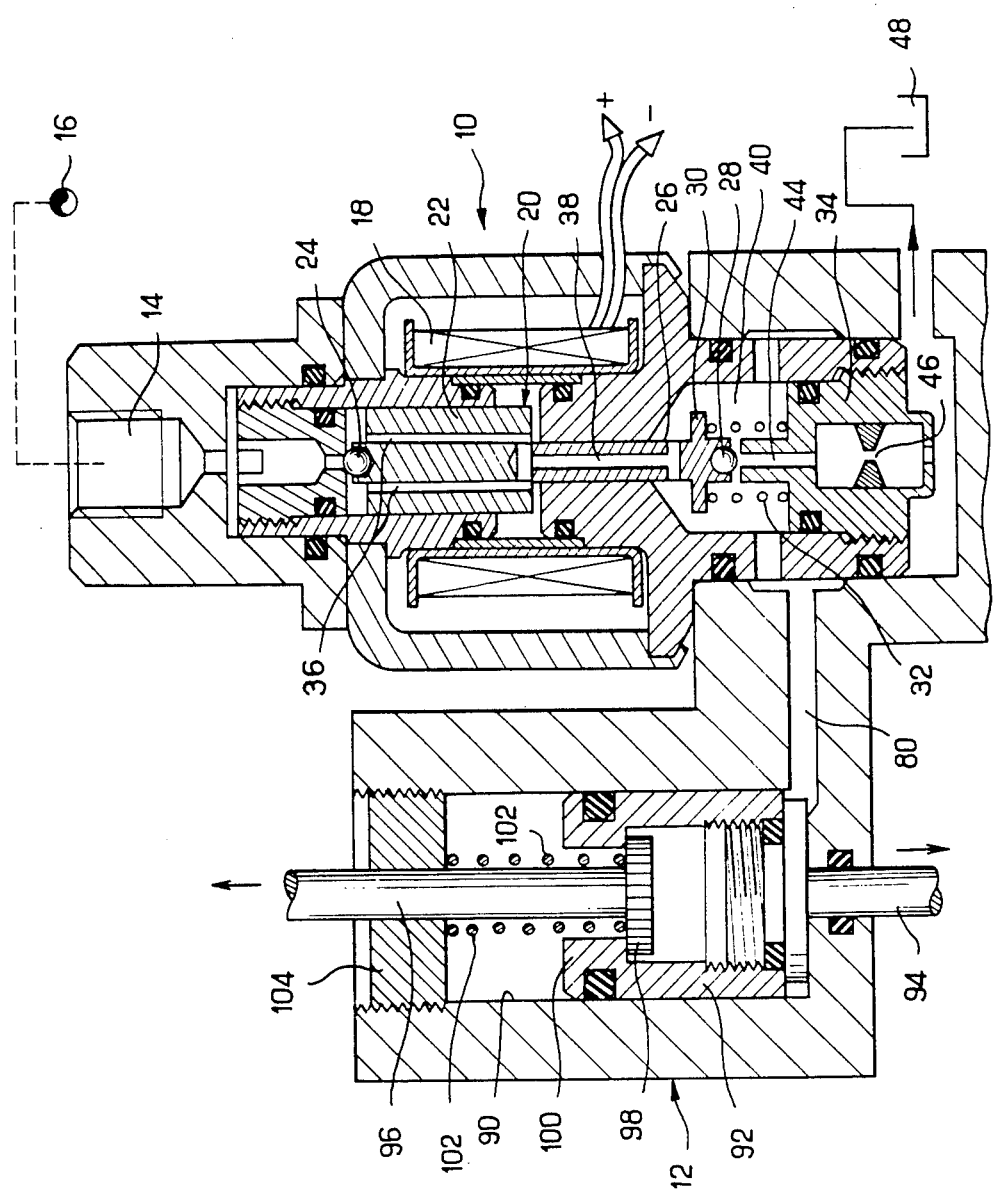
FIG._2

CLUTCH-DISENGAGING HYDRAULIC ACTUATORS PREVENTING WHEEL SLIP

BACKGROUND OF THE INVENTION

The present invention relates to hydraulic booster devices and more particularly to such devices intended for motor-vehicle clutch systems.

Under certain conditions, especially on slippery road surfaces, the braking of the wheels of a vehicle by means of the engine during deceleration, known as "engine braking", is too high and can cause the vehicle to skid inadvertently. There is a risk that this phenomenon will occur particularly in vehicles with four-wheel drive or with rear wheel drive.

SUMMARY OF THE INVENTION

It is therefore an object of the invention to provide, for a motor vehicle typically equipped with an anti-lock brake system, a hydraulic booster device intended to disengage the wheels of a vehicle as a function of a given electrical signal representing the speed of the vehicle, typically the wheel speeds, and coming, for example, from the anti-lock brake system.

According to the present invention, there is provided a hydraulic booster device intended to be arranged in parallel with a primary actuation circuit between an actuator mechanism and a receiver, the device comprising an electromagnetic valve means arranged between an actuator and a pressure-fluid source, the actuator comprising a piston means displaceable under the effect of the pressure-fluid and intended to actuate the receiver independently in response to an electrical control signal supplied to the valve means.

BRIEF DESCRIPTION OF THE DRAWINGS

The invention will now be described by way of example with reference to the accompanying drawings in which:

FIG. 1 is a diagrammatic view in longitudinal section of a first embodiment of a hydraulic booster device according to the invention: and FIG. 2 is a similar view in longitudinal section of a second embodiment.

DETAILED DESCRIPTION OF THE PREFERRED EMBODIMENTS

As illustrated in FIG. 1, the hydraulic booster device which, in the example illustrated, is intended to be associated with a hydraulic clutch system comprises, in general terms, a statinary solenoid valve 10 and a stationary hydraulic actuator 12. The solenoid valve 10 is provided with an inlet 14 intended to be connected to a source of hydraulic fluid under pressure 16, for example an accumulator of a brake system (not shown). The solenoid valve 10 comprises a solenoid 18, which is intended to be connected to an electrical actuation circuit (not shown), for example a circuit processing signals from wheel-speed sensors of an anti-lock brake system, and inside which is mounted a plunger means 20. The plunger means 20 comprises a first element 22 provided with a ball 24 and a second element 26 likewise provided with a ball 28 and having a collar 30, against which bears a spring 32 mounted on a closing element 34 in the solenoid valve 10. The plunger means 20 has at least two passages 36 in the first element 22 and one passage 38 in the second element 26, which together are capable of connecting the inlet 14 to a chamber 40 within the solenoid valve 10.

In the rest position of the solenoid valve 10 as illustrated, the spring 32 stresses the plunger means into a position in which the ball 24 closes a passage 42 connected to the inlet 14. Likewise, in the rest position, the ball 28 opens a passage 44 which is located in the closing element 34 and is provided with a restriction 46 and which leads to a low-pressure reservoir 48.

The hydraulic actuator 12 comprises a working chamber 50 intended to be connected, via an inlet 52, to a hydraulic clutch actuator mechanism (not shown) and, via an outlet 54, to a clutch receiver (not shown). Sealingly and slideably mounted in the working chamber 50 is a piston 56 which is stressed towards its rest position, as illustrated, up against a bottom 58 of the working chamber 50 by means of a spring 60. The bottom of the working chamber 50 is connected, at the rear of the piston 56, to the low-pressure reservoir 48 by means of a passage 62. The hydraulic actuator 12 also comprises a bore 64 which opens into the working chamber 50 and in which a second piston 66 is sealingly and slideably mounted. The second piston 66 has a longitudinal bore 68, in which a push rod 70 is slideably mounted. The piston 56 also has a longitudinal bore 72 of cross-section $S_1$, which is aligned with the bore 68 and in which is sealingly and slideably mounted a valve assembly 74 projecting into the working chamber 50 and having a valve member 76 which is made, for example, of elastomer and is adapted to close the inlet 52 and which has a cross-section $S_2$ greater than $S_1$. The bottom 78 of the bore 64 is connected by means of a passage 80 to the chamber 40 of the solenoid valve 10.

The device thus described operates in the following way:

In the illustrated rest position of the device, in which the solenoid is not energized, the inlet 14 is closed by the ball 24 under the effect of the spring 32, thereby isolating the chamber 40 from the high-pressure source 16. Since the ball 28 is in its open position, the chamber 40 is in hydraulic communication with the reservoir 48. The hydraulic actuator 12 is in its illustrated rest position and the clutch of the vehicle can be selectively actuated, the hydraulic fluid passing from the inlet 52 to the outlet 54 via the working chamber 50.

When a tendency for the vehicle wheels to lock or skid is detected, the electrical circuit actuates the solenoid 18, causing the plunger means 20 to move downwards, when viewing the drawing, opening the inlet 14 and allowing the fluid under pressure to pass from the source 16 towards the chamber 40 via the passages 36 and 38. Since the chamber 40 is isolated from the reservoir 48 because the passage 44 is closed by the ball 28, the fluid under pressure passes from the chamber 40 to the bottom 78 of the bore 64 via the passage 80. The hydraulic pressure at the bottom 78 of the bore 64 acts on the push rod 70 and on the assembly consisting of the piston 56 and of the second piston 66. Because the friction and inertia of the push rod assembly 70 and valve assembly 74 are only slight, this assembly moves very quickly and the valve member 76 closes the inlet 52. It is important to close the inlet 52 before a pressure is generated in the working chamber 50 to prevent the fluid from flowing back towards the low-pressure reservoir of the clutch actuator mechanism which, since it has not been actuated, still has its return passage to the reservoir open.

As soon as the inlet 52 has been closed, the assembly consisting of the piston 56 and the second piston 66 moves, thus immediately generating in the working chamber 50 a hydraulic pressure which is transmitted to the clutch receiver. Under these conditions, the action of the fluid pressure in the chamber 50 on the cross-sections $S_1$ and $S_2$ prevents the valve member 76 from being opened inadvertently in the case of a reflex actuation by the operator of the clutch transmitter.

Once the vehicle wheels begin to accelerate again, the electrical circuit de-energizes the solenoid valve 10, causing the closing of the inlet 14 and the opening of the passage 44. The hydraulic pressure at the bottom 78 of the bore 64 then decreases progressively because of the restriction 46, and the elements of the hydraulic actuator progressively resume their rest positions, thus ensuring progressive clutch re-engagement.

In an alternative embodiment (not shown), the inlet 52 opens into the bottom of the working chamber 50, the piston 56 having a passage which, when the device is operated, is intended to be closed by the valve assembly 74 which is integral with the second piston 66.

The hydraulic booster device illustrated in Figure 2 is intended to be associated with a mechanically controlled clutch system. In this embodiment, the solenoid valve 10 is substantially identical to that of the device in FIG. 1 and will not be described again.

The mechanical actuator 12 has a bore 90, in which is sealingly and slideable a piston means 92 integral with a first cable or rod 94 intended to be connected to a clutch receiver (not shown). A second cable or rod 96, intended to be connected to a clutch transmitter (not shown), has a widened head 98 which, by means of a lost motion coupling, is retained in the piston means 92 by an annular projection 100 on the piston means 92. A spring 102 is mounted on the cable 96 and bears on the widened head and on a closure element 104 fastened in the bore 90. The spring 102 keeps the cable 96 under tension, thus retaining the clutch pedal (not shown) against its rest bearing.

When the solenoid valve 10 is activated in the way described above, fluid under pressure is conveyed from the source 16 via the chamber 40 and the passage 80 towards the bore 90 of the actuator 12. The piston means 92 moves in the bore 90 under the effect of the hydraulic pressure and, by means of the cable 94, causes the immediate release of the clutch. In the same way as in the first embodiment, when the solenoid valve 10 is de-energized, it allows the fluid in the bore 90 to return towards the low-pressure reservoir 48 via the restriction 46, thus causing progressive clutch re-engagement. The cables 94 and 96 remain coupled mechanically, and the normal (manual) operation of the clutch is ensured under all circumstances.

I claim:

1. A hydraulic booster device intended to be arranged in parallel with a primary actuation circuit between an actuator mechanism and a receiver, the device comprising electromagnetic valve means arranged between an actuator and a source of fluid under pressure, the actuator comprising piston means displaceable under the effect of the fluid under pressure and intended to actuate the receiver independently in response to an electrical control signal supplied to the valve means, the primary actuation circuit comprising a mechanical connection between the actuator mechanism and the receiver, movement of the piston means causing the mechanical connection to be actuated, the piston means connected to the mechanical connection by means of a lost motion coupling, the piston means connected with a first member of the mechanical connection and displaceable by fluid pressure received from the valve means, the piston means having an opening which receives a second member of the mechanical connection, the second member having an enlarged portion captured within the piston means so as to allow movement of the second member relative to the piston means and provide said lost motion coupling, and resilient means biasing one of said members so as to urge the members toward one another.

2. The device according to claim 1, wherein the piston means is integral with the first member which extends from the actuator, and sealing means disposed about said first member and preventing fluid from exiting the actuator.

3. The device according to claim 2, wherein the actuator has a cavity with the piston means and second member disposed therein, the resilient means extending between the enlarged portion in the opening and a portion of the actuator.

4. A hydraulic booster device intended to be arranged in parallel with a primary actuation circuit between an actuator mechanism and a receiver, the device comprising electromagnetic valve means arranged between an actuator and a source of fluid under pressure, the actuator comprising piston means displaceable under the effect of the fluid under pressure in one chamber and intended to actuate the receiver independently in response to an electrical control signal supplied to the electromagnetic valve means, the primary actuation circuit being a hydraulic circuit and movement of the piston means generating a pressure in the circuit, the piston means having moveable valve means disposed sealingly and slidably within a longitudinal bore in the piston means and for closing a hydraulic passage between the actuator mechanism and receiver prior to movement of the piston means, the moveable valve means including a hydraulically actuated push rod quickly displaceable under the effect of the fluid under pressure in said one chamber, said push rod effecting displacement of sealing means in order to close the hydraulic passage prior to the piston means moving and generating said pressure in the circuit.

5. The device according to claim 4, wherein the piston means is disposed in a stepped bore of the actuator, the actuator having an inlet communicating with a chamber having an outlet to the receiver, and resilient means disposed in the chamber and biasing the piston means away from the inlet.

6. The device according to claim 5, wherein the actuator has a passageway communicating the stepped bore with a low pressure reservoir and an outlet of the electromagnetic valve means.

7. The device according to claim 5, wherein the piston means comprises a stepped piston and the passageway intersects the stepped bore at a shoulder of the stepped bore.

* * * * *